United States Patent [19]

Ellenberger et al.

[11] Patent Number: 5,322,562
[45] Date of Patent: Jun. 21, 1994

[54] PRODUCTION OF CEMENT-MORTAR DRY MIX

[75] Inventors: Peter Ellenberger, Feldmeilen; Heinz W. Schmitt, Buchs; Salvatore Valenti, Binningen; Qiwei Yang, Zurich, all of Switzerland

[73] Assignee: Sandoz Ltd., Basel, Switzerland

[21] Appl. No.: 729,097

[22] Filed: Jul. 12, 1991

[30] Foreign Application Priority Data

Jul. 12, 1990 [DE] Fed. Rep. of Germany ....... 4022233

[51] Int. Cl.$^5$ ................................................ C08K 3/34
[52] U.S. Cl. ...................................... 106/661; 106/823
[58] Field of Search ............... 106/661, 664, 665, 822, 106/823; 524/2

[56] References Cited

U.S. PATENT DOCUMENTS

| | | | |
|---|---|---|---|
| 4,067,838 | 1/1978 | Hayashi et al. | 260/29.2 |
| 4,362,566 | 12/1982 | Hinterwaldner | 106/85 |
| 4,737,193 | 4/1988 | Guttmann et al | 106/88 |
| 4,816,576 | 3/1989 | Buysch et al. | 544/398 |
| 4,913,741 | 4/1990 | Lane et al. | 106/86 |
| 4,957,951 | 9/1990 | Marohn | 523/401 |
| 4,961,790 | 10/1990 | Smith et al. | 106/823 |
| 4,986,854 | 1/1991 | Okuno et al. | 106/665 |

FOREIGN PATENT DOCUMENTS

| | | |
|---|---|---|
| 0409787 | 1/1991 | European Pat. Off. |
| 54-111599 | 8/1979 | Japan. |
| 56-20025 | 2/1981 | Japan. |

*Primary Examiner*—Mark L. Bell
*Assistant Examiner*—A. Wright
*Attorney, Agent, or Firm*—Robert S. Honor; Richard E. Vila; Carol A. Loeschorn

[57] ABSTRACT

A storable cement-mortar dry mix, which comprises the components cement, aggregate, reaction resin and hardener in a single mixture, wherein the hardener is present as the reaction product of the hardener with an organic acid or a functional derivative thereof.

12 Claims, No Drawings

PRODUCTION OF CEMENT-MORTAR DRY MIX

This invention relates to a process for the production of a storable cement-mortar dry mix containing a reactive resin and hardener therefor.

It is known from German Patent application DE 35 23 479 that, in the production of cement-mortar dry mixes which contain a reactive resin, it is desirable to have available a storable dry mix which contains all the components (except water) and only has to be mixed with water at the place of use. This problem was solved, according to DE 35 23 479, by mixing some of the components to form a preliminary mix A, and, if necessary, mixing the remaining components to form a preliminary mix B, and mixing these preliminary mixes with water at the place of use. Thus, at least two preliminary mixes have to be mixed with water; there is mentioned the possibility of making a single dry mix containing all the components except water in a storable mixture, but this apparently was not followed through.

It has now been found that it is possible to produce a cement-mortar dry mix comprising a reactive resin and hardener therefor, which contains all the components except water, and which is storable, which remains fluid over a long period of time and which does not harden prematurely. This is achieved by reacting the hardener with an organic acid or a functional derivative thereof, to form an anhydrous product, prior to its addition to the dry mix.

The invention therefore provides a process for the production of a cement-mortar dry mix, which comprises cement, aggregate, reactive resin and hardener in a single mixture, characterized in that the hardener is added in the form of a dry reaction product with an organic acid or a functional derivative thereof. The dry mixes thus produced can be stored for an unlimited period, and only at the place of use need they be mixed with water, after which they harden over time periods typical for equivalent conventional compositions to produce building materials with excellent strength.

The reaction products of the hardener (generally an amino-group-containing compound) with an organic acid or a functional derivative thereof, should be dry, that is, they should be powdery or granular solids and not aqueous fluids. They may be dry per se or they may be mixed with amorphous admixed materials such that are absorbed and converted to dry form and they can be added in this dry powder form. These reaction products are generally salts or amides, which hydrolyze in an alkaline medium. Thus, if the dry mix is brought into contact with water, the amine hardener is released and reacts with the reactive resin.

It is preferable to use carboxylic acids, polycarboxylic acids or functional derivatives of the acids, e.g. lactones or mixtures of carboxylic acids or polycarboxylic acids, which, after reacting with the hardener, yield a dry powder which readily hydrolyzes in an alkaline medium. Specific examples of such acids are gluconic acid or the lactone thereof, lactic acid, aminosulphonic acid and oxalic acid, oxalic acid being especially preferred. Superplasticizers which contain acidic groups may also be used, e.g. copolymers of styrene and maleic acid. However, if the reaction product is liquid at ambient temperature, for example, as occurs when formic acid is used, it is advantageous firstly to mix it with an amorphous admixed material so that a dry powder is obtained. This can then be easily incorporated into the dry mix according to the invention.

During the preparation of the cement-mortar dry mix, the reactive resin should not come into contact with the cement, but initially with an amorphous admixed material, so that during the mixing operation, the reactive resin and hardener are separated not only from each other but also from the cement, and no premature reaction can take place between the resin and hardener, nor can the solidifying properties of the cement be affected. Such admixed materials are non-crystalline materials, usually containing silicon, and which because of their large specific surface have an affinity for the reactive resin, but do not have the same hydraulic effect as cement. Examples of such materials are fly ash, trass, ground blast-furnace slag, silica fume and bentonite. Materials such as lampblack and active silicic acid may also be used, provided that their colour or price is acceptable for the application envisaged. The only proviso is that the grain size of these materials does not exceed 0.05 mm, and that their specific surface is greater than $0.2\ m^2/g$. The smaller the grain size and the greater the specific surface of these admixed materials, the smaller the quantity which will be needed.

Preferred amorphous admixed materials for the process according to the invention are fly ash and silica fume. These may be used alone or mixed.

The mixing procedure according to the invention is preferably carried out such that firstly the aggregate (e.g. sand) is mixed with the reaction resin, and then secondly with the special admixed material and with the cement to give a first preliminary mix. The reaction product of the hardener, given powder form where necessary by separate mixing with amorphous admixed material, is mixed with any further required admixtures and/or additives to give a second preliminary mix. The two preliminary mixes are finally combined to form a dry mix. Alternatively, the reactive resin may also be initially mixed with amorphous admixed material, and then all the components may be combined in one mixing operation.

The reactive resin suitable for use in this invention may be one of the polymerisable compounds which are known for this purpose and which are crosslinkable by means of an amine hardener. These are available commercially as so-called 2-component resins. Examples of such resins are epoxy resins. The corresponding hardeners are usually (and preferably) compounds containing amino groups.

The cements which are useful in this invention are the known hydraulic binding agents such as Portland cement, iron Portland cement, blast-furnace cement and trass cement. The preferred binding agent is Portland cement, and in particular Portland cement which is low in aluminates, such as so-called PCHS (Portland cement with high sulphate resistance).

The aggregate materials used are either natural stone, e.g. quartz sand, sea gravel, pit gravel, or artificial aggregates, e.g. blast-furnace slag, coal ashes, cinders and granulates, pumice from various base materials, calcined aluminous aggregates or organic aggregate materials.

For certain applications, reinforcing materials, such as fibres of steel, glass and plastics, can additionally be used.

There may also be used in the compositions of this invention polymer additives and cement admixtures. These are materials, which, used in small quantities, influence the properties of the finished cement mixes. The additives are usually organic in nature. Examples are defoamers, corrosion inhibitors, degassing agents, adhesion improvers, dispersing agents and pigments. The admixtures alter the workability, the ability to withstand frost or de-icing salt, absorption of water, solidifying times, etc., of the cement mix and are very well known to and widely used by the art. Examples of such admixtures are plasticizers and super-plasticizers, air entraining agents, concrete sealing materials, solidifying retardants, solidifying accelerators, compression aids and stabilizers.

A preferred dry mix contains, in addition to Portland cement, various constituents in the following quantities:

|  |  | preferably | more preferably | most preferably |
|---|---|---|---|---|
| reactive resin | 2–25% | 5–20% |  |  |
| hardener | 2–25% | 5–20% |  |  |
| fly ash | 10–200% | 10–100% | 30–100% | 30–80% |
| aggregate | 50–500% | 100–400% |  |  |
| cement admixtures | 0–20% | 0.5–10% | 0.5–5% | 1–3% |
| additives | 0–20% | 0–10% | 0.5–10% | 1–6% | whereby all percentages refer to the weight of the cement, the hardener being present in the form of an anhydrous reaction product with an organic acid or functional derivative thereof.

The dry mixes obtained, which contain reactive resin, may be used in many applications. As mortar (with sand as the aggregate), they may be used in building restoration, especially those attacked to a great extent by frost/salt, or to produce floors and coatings. With the incorporation of coarser aggregates, they may be used as construction material. Such dry mixes are also suitable for spraying.

In the following examples, all parts are understood to be parts by weight. The percentages are by weight and the temperatures are given in degrees Celsius.

EXAMPLE 1

Preparation of a dry powder hardener 5.263 parts of "Beckopox" (trade mark) EH 623 (amine hardener ex Hoechst) are prepared and heated to 75°–80°. 1500 parts of water are added at this temperature and the mixture is stirred for 60–90 minutes until a homogeneous mixture is obtained. Subsequently, 834 parts of oxalic acid are measured in over the course of 2–3 hours at the same temperature. The reaction mixture is dried over 2–2½ hours at 110° in a vacuum drying chamber, and pulverized. The dried powder has a melting point of 123°–127°.

EXAMPLE 2

Preparation of a dry powder hardener 40 parts of "Rütapox" (trade mark) ECC-4000-B amine hardener (from Bakelite GmbH) are added to a kettle, followed by 54.5 parts of water, and the mixture heated to 75°–80° C. and maintained at this temperature until a homogeneous blend is achieved (this takes no more than one hour). The blend temporarily becomes milky. To this blend is added 9.5 parts of hydrated oxalic acid ($C_2H_2O_4.2H_2O$), the addition being gradual such that the temperature remains in the range of 80°–85° C.

The product is a 45% (wt) solution of hardener which is converted to a dry powder by spray drying. The temperature at which spray drying is carried out should not exceed 80° C.

EXAMPLE 3

Preparation and testing of a cement-mortar dry mix

The following materials and quantities were used:

|  | parts |
|---|---|
| 1. mixed quartz sand 0.1–0.4 mm | 28.32 |
| 2. quartz sand 0.5–0.75 mm | 23.17 |
| 3. "Rütapox" ECC-4000 K.A. epoxy resin | 1.143 |
| 4. "Silane" (trade mark) A-187 adhesion improver | 0.06 |
| 5. "Balab" (trade mark) 3050A defoamer | 0.30 |
| 6. "TiONA" (trade mark) RCL-535 $TiO_2$ pigment | 1.00 |
| 7. EFA FILLER fly ash | 18.00 |
| 8. Portland cement | 25.00 |
| 9. Hardener (from Example 2) | 1.107 |
| 10. "Melment" (trade mark) F10 superplasticizer | 1.00 |
| 11. "Mebofix" (trade mark) 50 accelerator | 0.35 |
| 12. "Galoyl" (trade mark) CM 11 degassing agent | 0.05 |
| 13. "Elotex" (trade mark) 50V/907 water retention agent | 0.50 |

A premix is first made by blending materials 3–5. Materials 1 and 2 are mixed into this premix, and then material 6, material 7 and material 8 are added to this mixture in that order, blending of an added material being completed before the next material is added. The remaining materials (9–13) are then added and mixed in to give a dry mix.

The dry mortar was tested after storing for six months. Fresh mortar is produced according to DIN 18,555 part 1. The mortar is mixed for 3 minutes using 15% mixing water.

Control of the fresh mortar is carried out according to DIN 18,555 part 2. To determine the consistency, the tests are effected without performing the 15 lifting-dropping cycles specified in the DIN method.

Prisms of 4/4/16 cm are produced with the fresh mortar according to DIN 18,555. After one day, they are uncovered and stored for 6 days in a climate of 20°/95% relative humidity and for 21 days at normal climate of 20°/50% relative humidity according to DIN 50,014. The tests for flexural-bending strength and compressive strength are similarly carried out according to DIN 1,164. The bonding tensile strength is determined according to ZTV-SIB 87.

In all cases, the values found correspond to the normal values determined with freshly prepared mixtures.

We claim:

1. A process for the production of a storable cement-mortar dry mix, comprising the step of combining cement, aggregate, a reactive resin and a releasable hardener, characterized in that the reactive resin is premixed with an amorphous admixed material and the releasable hardener is the anhydrous reaction product of an amino group-containing hardener with an organic acid or a functional derivative thereof.

2. The process according to claim 1, wherein the releasable hardener is a dry powder.

3. A storable cement-mortar dry mix comprising cement, from 2–25% of a reactive resin, from 2–25% of a releasable hardener, from 10–100% of fly ash, from 50–500% of aggregate, from 0–20% of cement admixtures and from 0–20% of polymer additives, all percentages (%) being by weight, based on the weight of cement, said releasable hardener being the anhydrous reaction product of an amino group-containing hardener with an organic acid or a functional derivative thereof.

4. A dry mix according to claim 3, wherein the percentages of fly ash, cement admixtures and additives are from 30-100%, from 0.5-5% and from 0.5-10%, respectively.

5. A dry mix according to claim 3, wherein the percentages of fly ash, cement admixtures and additives are from 30-80%, from 1-3% and from 1-6%, respectively.

6. A process according to claim 1 wherein said amorphous admixed material is selected from the group consisting of fly ash, silica fume or a combination thereof.

7. A process according to claim 1 wherein said reactive resin is mixed with aggregate prior to being premixed with the amorphous admixed material.

8. A process according to claim 1 wherein said cement, aggregate, releasable hardener and reactive resin which has been premixed with the amorphous admixed material are combined in a single mixing operation.

9. A process according to claim 7 wherein the step of combining is accomplished by combining two preliminary mixtures, said first preliminary mixture comprising said aggregate, said reactive resin, said cement and an amorphous admixed material, provided said first preliminary mixture is prepared by premixing the aggregate with the reactive resin followed by the sequential mixing therewith of the amorphous admixed material and the cement, and said second preliminary mixture comprising the releasable hardener.

10. A process according to claim 9 wherein said second preliminary mixture additionally includes an admixture.

11. A process according to claim 9 wherein said second preliminary mixture further includes an additive.

12. A dry mix according to claim 3 wherein said reactive resin is present in an amount of 5-20%. said releasable hardener in an amount of 5-20%, the fly ash in an amount of 10-100%, said aggregate in an amount of 100-400%, the cement admixtures in an amount of 0.5 to 10% and said additives in an amount of 0-10%, all percentages (%) being by weight, based on the weight of cement.

* * * * *